United States Patent Office 2,951,145
Patented Aug. 30, 1960

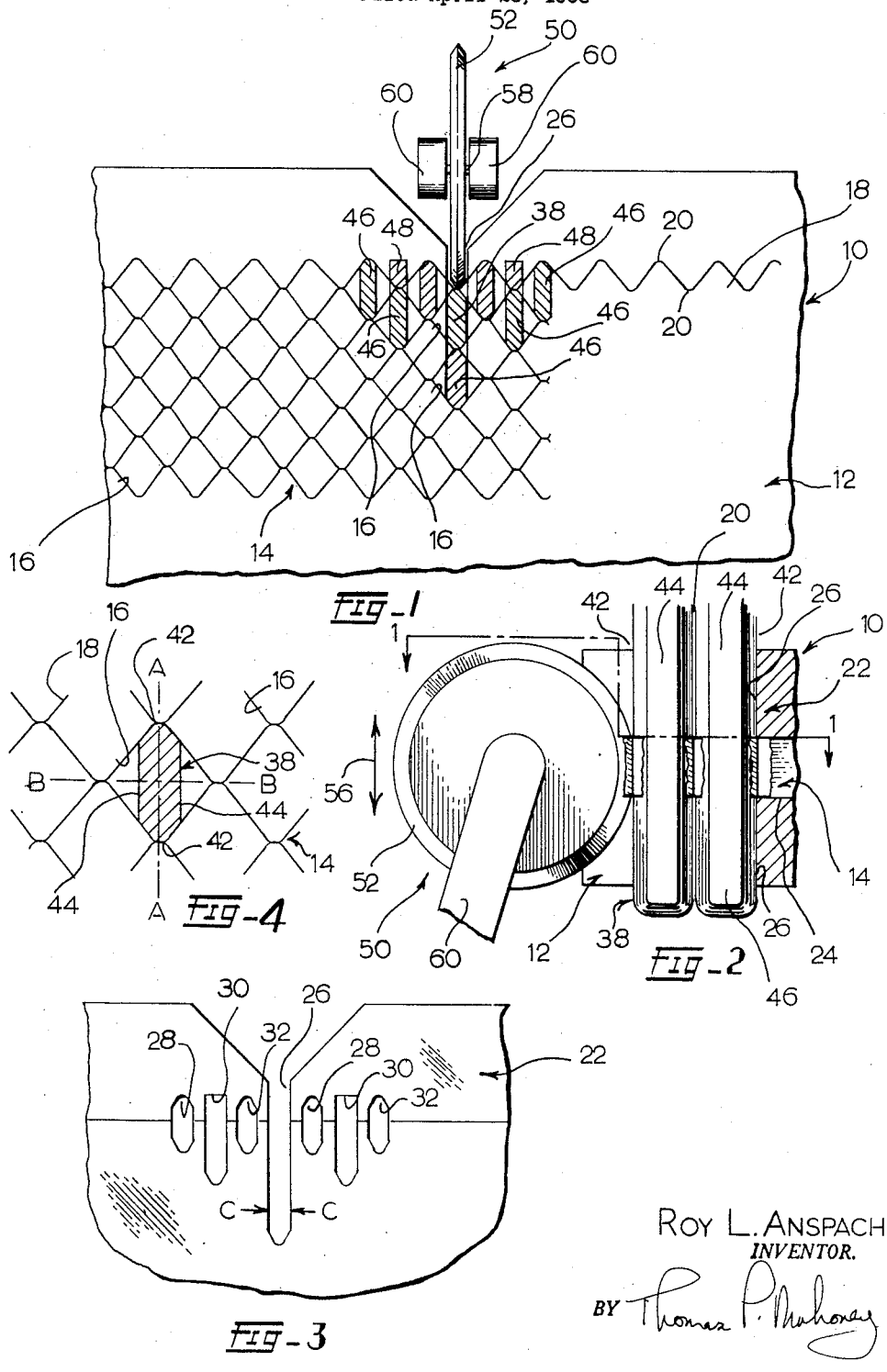

2,951,145

METHOD AND APPARATUS FOR FABRICATING HONEYCOMB CORE

Roy L. Anspach, Newport Beach, Calif., assignor to John J. Foster Mfg. Co., Costa Mesa, Calif., a corporation of California Filed Apr. 28, 1958, Ser. No. 731,281

6 Claims. (Cl. 219—83)

This invention relates to a method and apparatus for fabricating honeycomb core of the type generally utilized as core material in panels consisting of the aforesaid core and surface sheets attached to the opposite faces of the core.

The method and apparatus of the invention have particular application to the fabricating of honeycomb core from pre-corrugated strips of metallic foil, such as stainless steel and the like. The stainless steel foil utilized as core strip material comes in very light gages such as .002 inch and considerable difficulty as been encountered in the weldment of such light gage core strip stock into an acceptable honeycomb core.

It is, therefore, an object of the invention to provide an apparatus for manufacturing honeycomb core which includes a bed upon which the individual foil core strips intended to be fabricated into the core may be placed and which further includes a stripper plate disposed in spaced relationship with the bed in order to define a core strip receiving space between the bed and said plate whereby the individual pre-corrugated strips may be assembled into a honeycomb core.

Another object of the invention is the provision of an apparatus of the aforementioned character wherein the stripper plate and, if desired, the bed plate can be provided with at least one guide opening for the reception of an elongated electrode finger which is adapted to be inserted through the opening and to be reciprocated vertically by appropriate means, such as an electric motor or a hydraulic motor, with respect to the bed whereby the electrode finger will engage the nodal area of the core strip and support the same in contiguity to the nodal area of an adjacent strip while another electrode in the form of a welding wheel, or the like, is passed over the nodal area of the adjacent core strip to cause a welding current to flow between the nodal areas and between the respective electrode finger and electrode.

One of the greatest difficulties encountered in the fabrication of honeycomb core material from stainless steel foil by the use of welding techniques is the maintenance of the relatively high dimensional standards imposed upon the manufacturer where such honeycomb core is to be utilized in aircraft or similar demanding environments. Conventional honeycomb core manufactured by conventional processes is frequently characterized by irregular cell size and other abnormalities which prevent its being acceptable for use in aircraft applications.

The abnormalities referred to hereinabove are due, in large part, to the fact that no adequate means has been provided in the past for maintaining the dimensional stability of the core as it is fabricated from strips of core material, whether said strips are of the prefabricated, pre-corrugated type or whether the strips are of flat material.

A further object of the invention is the provision of an apparatus of the aforementioned type wherein the aforesaid elongated electrode finger is provided with a major dimension adapted to span the space between opposed nodal areas of a core cell in which it is disposed and wherein said finger has a minor dimension much less than the width of the cell in which it is located. Therefore, since the opposite edges of the finger can be maintained to precise tolerances due to the fact that it need not support the entire cell of the core structure in which it is located, and due further to the fact that it can be readily removed from operative relationship with the cell with which it is associated after the completion of the welding process, distortion attributable to inadequate dimensional suport of the cell structure during the welding operation or to inadequate means for removal of the electrode finger from operative relationship with the cell is eliminated.

Another object of the invention is the provision of a method of fabricating honeycomb core from pre-corrugated strips of foil which includes the basic concept of arranging a strip of the pre-corrugated foil with its alternate nodal areas disposed in contiguity to the alternate nodal areas of the cells on the adjacent edge of a partially completed core structure located in the above described apparatus and which further includes the step of inserting into a selected cell of the partially fabricated core structure an electrode finger adapted to support and engage only a portion of the wall of the cell in which it is located, said portion being constituted by opposed nodal areas of the cell.

Also within the scope of the method of the invention is the step of imposing another electrode on the nodal area of the core strip immediately adjacent the nodal area of the cell in order that welding current may be caused to flow between the respective electrodes and the nodal areas to weld said nodal areas to each other and the subsequent step of causing the core to abut on a stripper plate through which the electrode finger is withdrawn while preventing withdrawal of the core structure by making the hole in the stripper plate through which the finger is withdrawn of a smaller dimension than the cell which has been supported by the aforesaid finger during the welding operation.

Other objects and advantages of the invention will be apparent from the following specification and the accompanying drawing which is for the purpose of illustration only and in which:

Fig. 1 is a transverse, partially sectional view taken on the broken line 1—1 of Fig. 2;

Fig. 2 is an enlarged, fragmentary, sectional view of the aforesaid portion of the apparatus;

Fig. 3 is a fragmentary plan view showing a portion of the stripper plate of the apparatus; and Fig. 4 is an enlarged, fragmentary, sectional view showing the relationship between the electrode finger and the core structure which is fabricated by the utilization thereof.

Referring to the drawing and particularly to Figs. 1–2 thereof, I show the core fabricating apparatus 10 of my invention, said core fabricating apparatus including a bed plate 12 formed from metal such as steel and being adapted to support a core structure 14 being fabricated therein. The core structure 14 is, as best shown in Fig. 1 of the drawing, of the honeycomb type and includes a plurality of substantially hexagonal cells 16 which are constituted by a plurality of core strips 18.

The core strips 18 are, as best shown in Fig. 1 of the drawing, pre-formed into corrugated configuration to provide alternately oriented nodal areas 20 which, when juxtaposed to the adjacent nodal area of an adjacent core strip, can be welded to each other to provide a core structure of the character of that shown at 14 in Fig. 1 of the drawing. The core strips 18 are fabricated from relatively light gage metal, such as stainless steel foil in the range between .002 to .005 inch and, due to the fact that such light gage metals are nothing more than foil, considerable difficulty is encountered when using conventional apparatus and methods in forming cells 16 which will comply with the relatively high specifications established by the aircraft industry.

Disposed above and in spaced relationship with the bed plate 12 is a stripper plate 22, said stripper plate being spaced from the upper surface of the bed plate 12 a sufficient distance to provide a core strip receiving space 24 in which, as best shown in Figs. 1 and 2 of the drawing, a core structure 14 may be assembled. In order to permit relative longitudinal movement of the core structure with reference to the stripper plate, the stripper plate may be vertically movable by a hydraulic or other type motor, not shown, which will permit the stripper plate to be raised sufficiently to clear the upper surface of the core structure 14 when it is bodily shifted across the bed plate 12 below the stripper plate 22.

The stripper plate 22 is, as best shown in Fig. 3 of the drawing, provided with a plurality of openings including a centrally located opening 26 and oppositely oriented openings 28, 30, and 32. Similar openings are formed in the bed plate 12 and are coincidental with the openings in the superimposed stripper plate 22.

Operatively associated with the apparatus 10 and adapted to be reciprocated through the centrally located opening 26 is an elongated electrode finger 38 which, as best shown in cross section in Fig. 4 of the drawing, is characterized by a width A—A constituting the major cross-sectional dimension of the finger 38 and a thickness B—B constituting the minor dimension of the electrode finger 38. On its opposite edges 42, the configuration of the electrode finger 38 is such that it conforms substantially to the nodal areas of an adjacent core strip and the major dimension A—A is equivalent to the major dimension of the cell 16 of a core structure 14 which is to be fabricated by the use of the apparatus 10 of my invention. By nodal area is meant not only the nodal points at the apices of the core strips and cell walls, but the area of the cell walls immediately adjacent thereto.

It will be noted, however, that the minor dimension B—B of the electrode finger 38 is such that the side walls or sides 44 of the electrode finger 38 are spaced a substantial distance from the adjacent portions of the walls of the cell 16 in which the finger 38 is located. Associated with the electrode finger 38 are other fingers 46 which, while they do not serve an electrode function, are received in the cells 16 of the core structure 14 to support said cells during the welding operation, for a purpose which will be described in greater detail below. Half fingers 48 are also provided which serve the same supporting function as the fingers 46.

The elongated electrode finger 38 and the associated fingers 46 and 48 are all connected to a motor, not shown, which is adapted to reciprocate the electrode 38 and the associated fingers 46 and 48 vertically in order that the fingers 46 and 48 and the electrode 38 may be withdrawn upwardly from the openings with which they are associated and from operative relationship with the cells 16 of the core structure 14 which is being fabricated thereupon. The openings in the bed plate 12 and the stripper plate 22 are, as best shown in Fig. 3 of the drawing, of a width C—C substantially equivalent to the thickness B—B of the associated electrode 38 and fingers 46 and 48.

The centrally located opening 26 formed in the bed plate 12 and the identical opening 26 formed in the stripper plate 22 are adapted, as best shown in Fig. 1 of the drawing, to receive both the elongated electrode finger 38 and the associated and similarly shaped and dimensioned finger 46 which serves to back up the electrode finger 38 and to properly align the cell 16 in which it is located with the cell 16 in which the electrode finger is positioned. The openings 28 and 32, on the other hand, are shaped and dimensioned, allowing for tolerances, to the exact shape and dimension of the respective fingers 48 located therein, while the openings 30 are shaped and dimensioned to receive associated fingers 46 and the half fingers 48.

Operatively associated with the apparatus 10 is a second electrode 50 which is constituted by a welding wheel 52 mounted for vertical reciprocation in the direction of the arrow 56 on an axle 58 extending between supporting arms 60 which are secured to an appropriate source of motive power, not shown, such as an electric or hydraulic motor.

It is, of course, understood that the first electrode constituted by the elongated electrode finger 38 and the second electrode constituted by the welding wheel 52 are connected to and constitute the opposite terminals of a conventional resistance welding circuit, not shown, and that the resistance welding circuit can be properly energized by well known conventional means to cause the flow of welding current between the welding wheel 52 and the elongated electrode finger 38 to cause the welding of juxtaposed nodal areas of adjacent core strips 18 to each other, in a manner which will be described in greater detail immediately hereinbelow.

In utilizing the apparatus 10, at least two core strips 18 are initially fed into the core strip receiving space 24 between the bed plate 12 and stripper plate 22 while the various fingers 46, 48 and the elongated electrode finger 38 are withdrawn upwardly out of the space 24. The two strips 18 are disposed with alternate nodal areas 20 in alignment to define the cells 16 and the first pair of nodal areas 20 are located in juxtaposition to and overlying the opening 26 whereby when the apparatus is energized the elongated electrode finger 38 will descend and lie behind the nodal area 20 of the first strip and whereby the welding wheel 52 of the second electrode 50 will ultimately be reciprocated vertically in the direction of the arrow 56 of Fig. 2 to engage the nodal area of the other strip 18 whereby the nodal areas of the respective strips will be welded to each other.

After the first row of cells 16 of the core structure 14 has been fabricated in the above described manner, the incomplete core structure can be successively fed through the apparatus 10 with an associated core strip 18 having its alternate nodal areas 20 juxtaposed to the adjacent and alternate nodal areas of the cells 16 of the incomplete core structure 14 whereby the electrode 38 can be caused to enter the cell 16 at the edge of the core structure 14 overlying the centrally located opening 26 in order to properly locate the cell 16 in respect to the core strip 18 and the welding wheel 52 adapted to complete the welding operation.

It will also be noted that, as the core structure 14 is built up, the other fingers 46 and 48 enter registering cells 16 in order that the cells 16 adjacent the cell 16 in which the elongated electrode finger 38 is located may be adequately supported to eliminate distortion in the welding area.

As previously discussed, the electrode 38 has its major dimension A—A disposed in the cell 16 so that the opposite edges 42 are located in oppositely disposed nodal areas of the cell and so that the minor dimension B—B thereof is located to orient the sides 44 of the finger 38 in spaced relationship with the nodal areas of the cell 16 on opposite sides of the finger 38.

Thus, during the welding operation in which the welding wheel 52 is passed over the nodal area of the core strip 18 juxtaposed to the nodal area of the cell 16 in which the electrode finger 38 is located, the critical dimension of the cell 16 is maintained. However, when the next step of the operation takes place wherein the electrode 38 and the fingers 46 and 48 are withdrawn from operative relationship with the respective cells, the stripping of the core structure 14 is readily accomplished by virtue of the fact that the fingers 46 and 48 and the electrode finger 38 pass through the openings in the stripper plate 22 but the adjacent edges of the cells of the core are adequately supported upon the contiguous surfaces on the underside of the stripper plate 22, thus permitting the core structure 14 to be readily stripped from operative relationship with the welding electrode 38 and the associated fingers 46 and 48.

If desired, the fingers 46 and 48 and the associated electrode finger 38 can be reciprocated from right to left to shift the core structure 14 in the desired direction prior to the wtihdrawal of the electrode finger 38 and the associated fingers 46 and 48 from operative relationship with the core structure 14 or other means of translating the core structure 14 with respect to the bed plate 12 and stripper plate 22 can be utilized.

I thus provide by the apparatus of my invention relatively simple means whereby the core structure 14 can be fabricated and whereby the individual cells of said structure can be stripped from the supporting electrode and fingers without damaging or otherwise injuring the core structure during the process of fabricating the same. Moreover, the support of the core structure cells adjacent the welding area by the electrode finger and the associated supporting fingers maintains the dimensional stability necessary in honeycomb cores of the character under consideration here.

I claim:

1. In a honeycomb core fabricating machine, the combinaiton of: a movable electrode in the form of an elongated finger; a bed plate located below said electrode for supporting a pair of corrugated core strips with their nodal areas in juxtaposed relationship; a stripper plate disposed above said bed plate in spaced relationship therewith to define a core strip receiving space, said plate having an opening for the reception of said electrode; means for moving said electrode downwardly through said opening and into engagement with only a nodal area of one of said strips to support said strip during a welding operation; and another electrode engageable with only the nodal area of the other strip and adapted to traverse said nodal area to cause welding current to flow through said nodal areas between said electrodes.

2. In a honeycomb core fabricating machine, the combination of: a bed plate for supporting a previously fabricated core section with the nodal areas of its cell at one edge juxtaposed to the nodal areas of a core strip to be welded thereto; a stripper plate disposed above and in spaced relationship with said bed plate to define a core strip receiving space, said stripper plate having an opening therein overlying one of said cells; an elongated electrode finger insertible through said opening and into said one cell to support only the nodal area thereof during the welding operation; and another electrode movable across the nodal area of said core strip abutting said cell nodal area to weld said areas to each other.

3. In a honeycomb core fabricating machine, the combination of: a bed plate for supporting a previously fabricated core section with the nodal areas of its cells at one edge juxtaposed to the nodal areas of a core strip to be welded thereto; a stripper plate disposed above and in spaced relationship with said bed plate to define a core strip receiving space, said stripper plate having an opening therein overlying one of said cells; an elongated electrode finger insertible through said opening and into said one cell to support only the nodal area thereof during the welding operation, said finger having a cross section smaller than the cell cross section whereby said finger will engage only the aforesaid cell nodal area; and another electrode movable across the nodal area of said core strip abutting said cell nodal area to weld said areas to each other.

4. In a honeycomb core fabricating machine, the combination of: a movable electrode in the form of an elongated finger; a bed plate located below said electrode for supporting a pair of corrugated core strips with their nodal areas in juxtaposed relationship; a stripper plate disposed above said bed plate in spaced relationship therewith to define a core strip receiving space, said plate having an opening for the reception of said electrode; means for moving said electrode downwardly through said opening and into engagement with only a nodal area of one of said strips to support said strip during a welding operation; and another electrode engageable with only the nodal area of the other strip and adapted to traverse said nodal area to cause welding current to flow through said nodal areas between said electrodes, the thickness of said finger being less than the distance between adjacent nodal areas of the core strip whereby said finger engages only the juxtaposed nodal area of said one strip.

5. In a honeycomb core fabricating machine, the combination of: a bed plate for supporting a previously fabricated core section with the nodal areas of its cells at one edge juxtaposed to the nodal areas of a core strip to be welded thereto; a stripper plate disposed above and in spaced relationship with said bed plate to define a core strip receiving space, said stripper plate having an opening therein overlying one of said cells; an elongated electrode finger insertible through said opening and into said one cell to support only the nodal area thereof during the welding operation, said finger having a major cross-sectional dimension whereby it spans said one cell to engage opposite nodal areas thereof and a minor cross-sectional dimension whereby its sides are disposed in spaced relationship with adjacent nodal areas of said cell and said opening conforming to said minor dimension; and another electrode movable across the nodal area of said core strip abutting said cell nodal area to weld said areas to each other.

6. In a honeycomb core fabricating machine, the combination of: a bed plate for supporting a previously fabricated core section with the nodal areas of its cells at one edge juxtaposed to the nodal areas of a core strip to be welded thereto; a stripper plate disposed above and in spaced relationship with said bed plate to define a core strip receiving space, said stripper plate having an opening therein overlying one of said cells; an elongated electrode finger insertible through said opening and into said one cell to support only the nodal area thereof during the welding operation, the width of said finger being equal to the width of said one cell to permit said finger to supportively engage opposite portions of said cell wall and the thickness thereof being less than said width to space the sides of said finger from said wall and said opening having a minor dimension substantially equal to said thickness; and another electrode movable across the nodal area of said core strip abutting said cell nodal area to weld said areas to each other.

References Cited in the file of this patent

UNITED STATES PATENTS

| 2,747,064 | Pappelendam | May 22, 1956 |
| 2,780,716 | Wasilisin et al. | Feb. 5, 1957 |
| 2,789,203 | Pigo et al. | Apr. 16, 1957 |
| 2,843,722 | Wegeforth | July 15, 1958 |